United States Patent [19]
Xing et al.

[11] Patent Number: 5,792,576
[45] Date of Patent: Aug. 11, 1998

[54] LIMITED RECHARGEABLE LITHIUM BATTERY BASED ON A CATHODE SLURRY

[75] Inventors: Xuekun Xing, Richmond Heights; Tibor Kalnoki-kis, Westlake; George W. Moutsios, Parma, all of Ohio

[73] Assignee: Gould Electronics Inc., Eastlake, Ohio

[21] Appl. No.: 748,500

[22] Filed: Nov. 8, 1996

[51] Int. Cl.$^6$ ................................................ H01M 4/02
[52] U.S. Cl. ................................................ 429/218; 429/192
[58] Field of Search ................................ 429/190, 218, 429/224, 194, 217

[56] References Cited

U.S. PATENT DOCUMENTS

| | | | |
|---|---|---|---|
| 4,080,728 | 3/1978 | Buckler | 29/623.4 |
| 4,177,330 | 12/1979 | Gordon et al. | 429/152 |
| 4,429,026 | 1/1984 | Bruder | 429/152 |
| 4,466,470 | 8/1984 | Bruder | 141/1.1 |
| 4,579,792 | 4/1986 | Bruder | 429/162 |
| 4,977,046 | 12/1990 | Bleszinski, Jr. et al. | 429/194 |
| 5,211,933 | 5/1993 | Barboux et al. | 423/596 |
| 5,240,790 | 8/1993 | Chua et al. | 429/190 |
| 5,370,949 | 12/1994 | Davidson et al. | 429/224 |
| 5,425,932 | 6/1995 | Tarascon | 423/599 |
| 5,449,577 | 9/1995 | Dahn et al. | 429/94 |
| 5,514,496 | 5/1996 | Mishima et al. | 429/218 |
| 5,518,842 | 5/1996 | Fey et al. | 429/218 |
| 5,558,961 | 9/1996 | Doeff et al. | 429/224 |
| 5,604,057 | 2/1997 | Nazri | 429/224 |
| 5,620,811 | 4/1997 | Zhang et al. | 429/192 |

*Primary Examiner*—M. Nuzzolillo
*Attorney, Agent, or Firm*—Michael A. Centanni

[57] ABSTRACT

The present invention provides a limited rechargeable lithium battery containing an anode; a cathode slurry containing about 55 to about 75% by weight of a transition metal oxide, about 3 to about 8% by weight of a conductor, and about 20 to about 40% by weight of an organic electrolyte containing an electrolyte salt and an organic solvent; a separator between the anode and the cathode slurry; and at least two current collectors. The present invention also provides a method of making a cathode slurry.

16 Claims, 4 Drawing Sheets

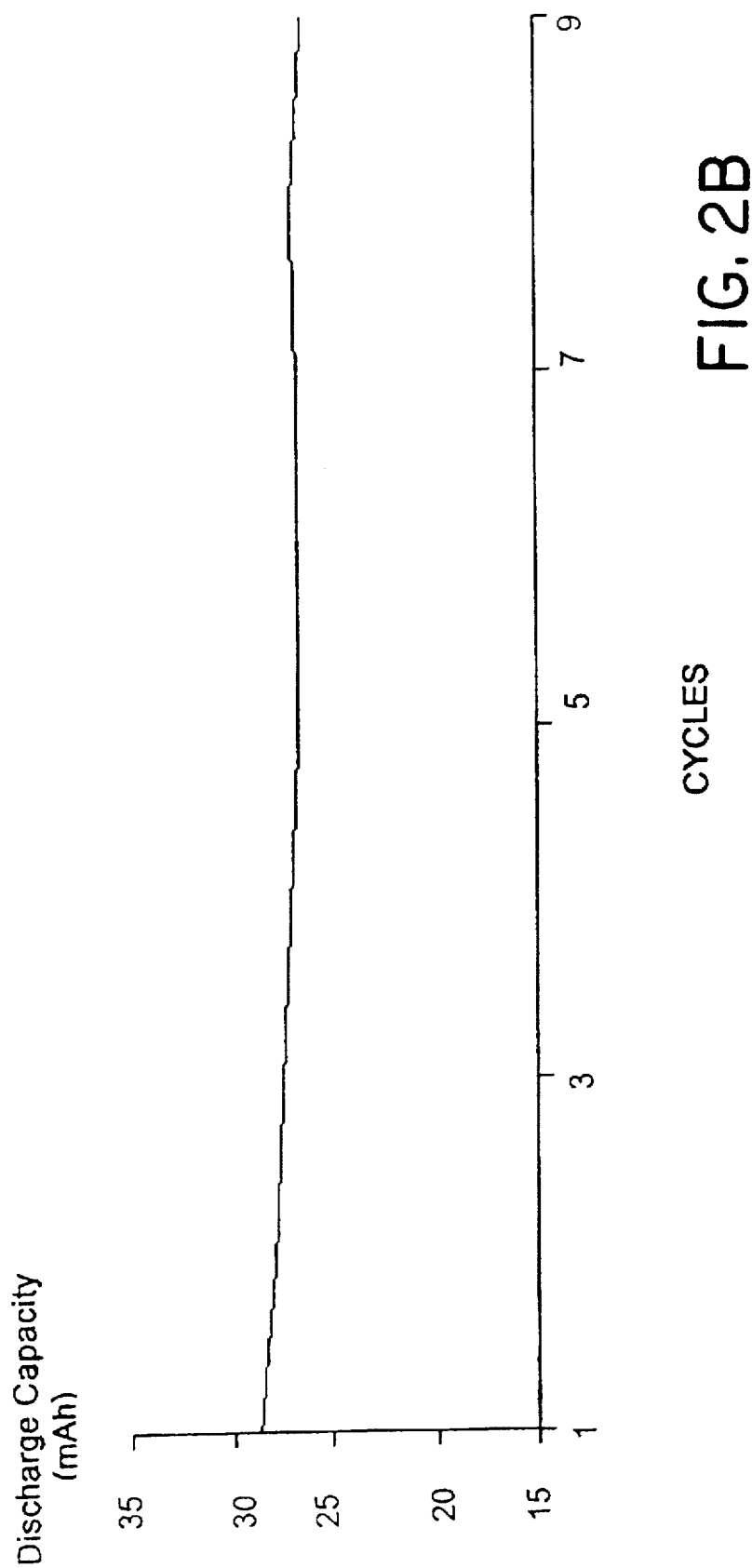

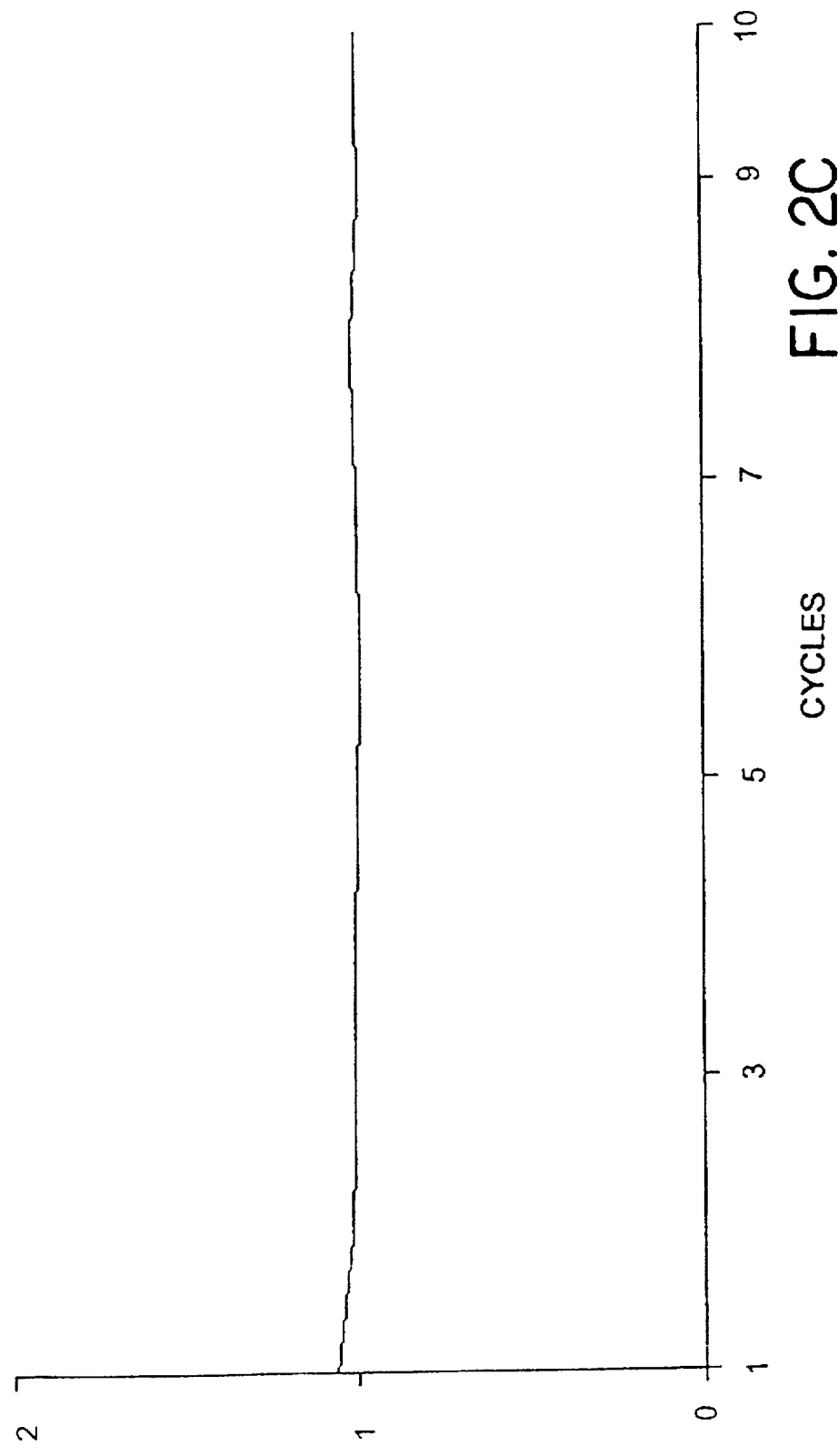

5,792,576

LIMITED RECHARGEABLE LITHIUM BATTERY BASED ON A CATHODE SLURRY

FIELD OF THE INVENTION

The present invention relates to a limited rechargeable lithium battery containing a cathode slurry. More particularly, the present invention relates to a cathode slurry, a method of making a cathode slurry, and a limited rechargeable lithium battery containing a cathode slurry.

BACKGROUND OF THE INVENTION

Primary lithium batteries and secondary lithium batteries are known. Primary lithium batteries are characterized by relatively long, stable energy output. Primary lithium batteries generally contain a $MnO_2$ as a cathode-active material which is subject to chemical and structural change resulting from charging. Secondary or rechargeable lithium batteries are characterized by a long cycling life as a result of improved charge capability. Accordingly, the characteristics of primary lithium batteries are different from the characteristics of secondary lithium batteries.

Efforts to improve the quality of either primary or secondary lithium batteries involve improving one of their characteristics. Methods of improving a primary lithium battery, however, are not necessarily applicable to improving secondary lithium batteries. For instance, it may be of prime importance to increase the capacity of a primary lithium battery whereas it may be of prime importance to increase the number of cycles of a secondary lithium battery. As a result, improvements in battery technology serve to further distinguish primary from secondary lithium batteries.

In order to realize advantages associated with both primary and secondary lithium batteries, it is desirable to provide a limited rechargeable lithium battery. In other words, it is desirable to provide a lithium battery having not only the characteristics of a primary lithium battery, but also rechargeability in a limited fashion.

SUMMARY OF THE INVENTION

In one embodiment, the present invention provides a limited rechargeable lithium battery containing an anode; a cathode slurry containing about 55 to about 75% by weight of a transition metal oxide, about 3 to about 8% by weight of a conductor, and about 20 to about 40% by weight of an organic electrolyte containing an electrolyte salt and an organic solvent; a separator between the anode and the cathode slurry; and at least two current collectors. In another embodiment, the present invention provides a renewable lithium battery containing an anode; a cathode slurry containing about 60 to about 70% by weight of a transition metal oxide, about 4 to about 6% by weight of a conductor, and about 25 to about 35% by weight of an organic electrolyte containing an electrolyte salt and an organic solvent; a separator between the anode and the cathode slurry; and at least two current collectors. In yet another embodiment, the present invention provides a method of making a cathode slurry including the steps of mixing about 55 to about 75% by weight of a transition metal oxide, about 3 to about 8% by weight of a conductor, and about 20 to about 40% by weight of an organic electrolyte containing an electrolyte salt and an organic solvent.

As a result, the present invention provides a lithium battery capable of undergoing limited charge-discharge cycles. In particular, the present invention provides batteries capable of recharging about 5 to about 15 cycles.

BRIEF DESCRIPTION OF THE DRAWINGS

FIG. 2(B) is a graphical representation of discharge capacity versus cycle number of the limited rechargeable lithium battery according to Example 1; and FIG. 2(C) is a graphical representation of coulombic efficiency versus cycle number of the limited rechargeable lithium battery according to Example 1.

DETAILED DESCRIPTION

Figure 1:
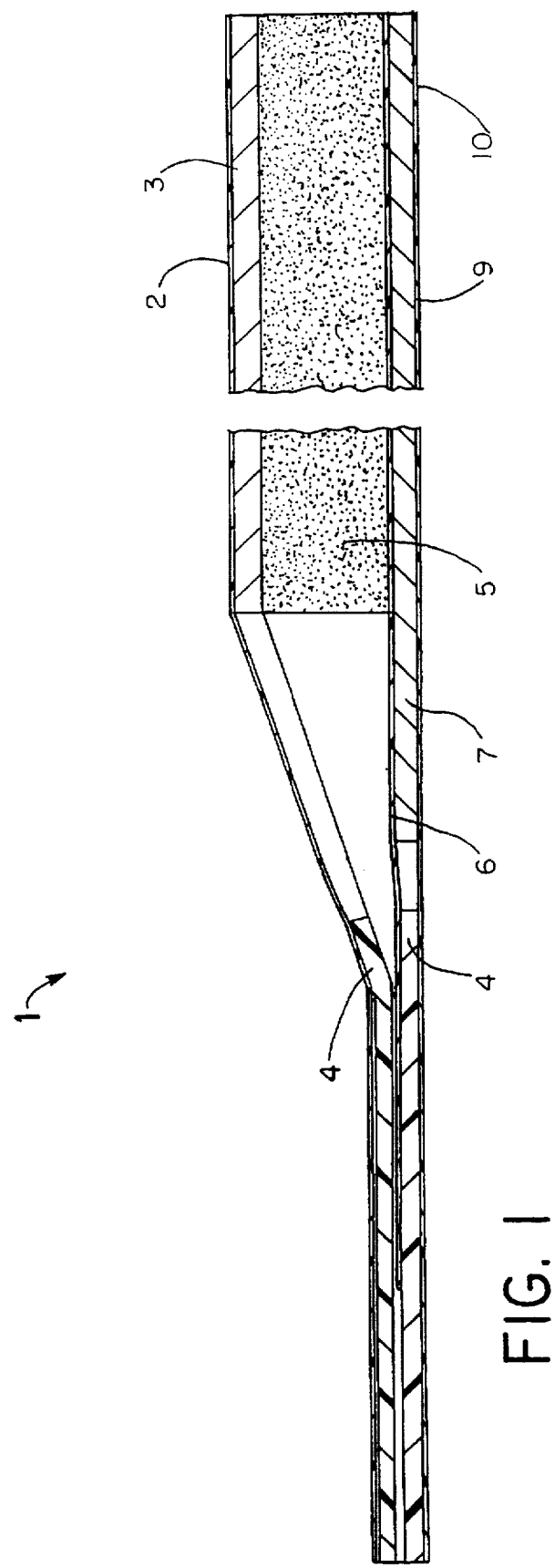
FIG. 1 is an illustration of an embodiment of a limited rechargeable lithium battery.

The limited rechargeable lithium battery according to the present invention contains a cathode slurry. The cathode slurry contains a transition metal oxide. The transition metal oxide is a cathode-active material. A cathode active material provides energy by participating in chemical reactions within the battery. The transition metal oxide is present in an amount from about 55 to about 75% by weight, and preferably from about 60 to about 70% by weight. Transition metal oxides include lithium transition metal oxides and vanadium oxides. Lithium transition metal oxides include $LiMn_2O_4$, $Li_2Mn_4O_9$ and $Li_2MnO_3$. Vanadium oxides include $V_6O_{13}$. In one embodiment, transition metal oxides specifically exclude $MnO_2$. The transition metal oxides containing lithium can be made by thermally reacting $MnO_2$ and suitable lithium salts such as $Li_2CO_3$. Vanadium oxide can be prepared by heating $NH_4VO_3$ in an argon atmosphere.

The cathode slurry also contains a conductor. The conductor is present in an amount from about 3 to about 8% by weight of the cathode slurry, and preferably from about 4 to about 6% by weight. The conductor may be any suitable electronically conductive material. In one embodiment, the conductor is a carbon-containing material. Carbon-containing materials include carbon black, acetylene black and graphites. In another embodiment, the conductor is a conductive polymer. Conductive polymers include polypyrroles and polyanilines.

The cathode slurry also contains an organic electrolyte. The organic electrolyte is present in an amount from about 20 to about 40% by weight of the cathode slurry, and preferably from about 25 to about 35% by weight. The organic electrolyte contains an electrolyte salt and an organic solvent. Suitable electrolyte salts include $LiCF_3SO_3$, $LiPF_6$, $LiAsF_6$, $LiClO_4$ and $LiN(CF_3SO_2)_2$. The organic solvent may be one or more organic solvents and/or one or more polar aprotic organic liquids. Suitable organic solvents include one or more of the following: ethylene carbonate, propylene carbonate, dimethoxyethane (glyme), diglyme, triglyme and other glycol ethers, dimethylsulfoxide, dioxolane, sulfolane, tetrahydrofuran and gamma-butyrolactone. In a preferred embodiment, two or more organic solvents are used in the cathode slurry. Preferably, both propylene carbonate and dimethoxyethane are used. The organic solvents are characterized in that they do not contain notable amounts of water. The organic solvents are characterized in that they only contain water in a small amount, such as about 20 ppm or less. In other words, the organic solvents may be anhydrous or the organic solvents merely do not contain added water. The concentration of the electrolyte salt in the organic solvent is from about 0.5M to about 2M, and preferably from about 1M to about 1.5M.

The cathode slurry may contain additional components which improve the performance of the resultant limited rechargeable lithium batteries. For instance, the cathode slurry may contain dispersing agents and/or surfactants and more particularly nonionic surfactants. Examples of nonionic surfactants include sorbitan derivatives such as sorbitan monooleate (Span-80 available from ICI Surfactants), and ethoxylated alkyphenols such as octylphenoxypolyethoxyethanol (Triton X-100 available from Union Carbide) and others.

The cathode slurry may be made by combining and mixing appropriate amounts of the cathode-active material, conductor, organic electrolyte, and any additional components. The mixture may be thoroughly stirred in order to obtain a uniform mixture. There is no particular order in which the cathode slurry components may be combined.

Limited rechargeable lithium batteries in accordance with the present invention contain a cathode slurry. As used herein, the term "slurry" refers to the physical characteristics of the cathode. In particular, a slurry refers to a paste-like material. In other words, a slurry is not a powder or a liquid, but instead it is a material described as a physical mixture of a liquid and a solid where both components are present in significant proportions and having intermediate properties of the individual constituents. For instance, a slurry may hold its shape (subject to slight deformation from gravity), but may readily flow upon the application of slight pressure. These particular characteristics may be manipulated, as desired, by varying the amounts of the cathode slurry components in the cathode slurry.

In one embodiment, the slurry cathode is characterized in that it does not contain a binder. Binders include ethylene propylenediene monomer, polyolefins, polytetrafluoroethylene, polyvinylidene difluoride, polyamide resin, polyvinylpyrrolidone, various elastomers and mixtures thereof. The presence of a binder may complicate the fabrication of the limited rechargeable lithium battery.

The slurry cathode is further characterized in that it does not contain aqueous solvents. Aqueous solvents include water and solutions containing a substantial amount of water. The absence of water improves the performance of the limited rechargeable lithium battery because side reactions caused by the presence of water are avoided.

The limited rechargeable lithium battery contains an anode. The anode may be a metallic lithium anode such as a lithium-containing metal foil. In one embodiment, the anode is a lithium foil or a lithium alloy foil. When the anode is lithium foil or a lithium alloy foil, the thickness of the foil is between about 0.05 mm and about 0.5 mm, and preferably between about 0.075 mm and about 0.2 mm.

The limited rechargeable lithium battery contains a separator between the anode and the cathode slurry. The separator can prevent direct contact between electrodes. The separator is preferably microporous. The separator may be made of a polyolefin such as polyethylene, polypropylene or copolymers of polyethylene and polypropylene, polyester, nylon, and glass fiber. The separator is preferably made of fibers and/or cellulosic materials, woven or non-woven fibrous material. The thickness of the separator is from about 0.02 mm to about 0.05 mm. Preferably, the thickness of the separator is from about 0.025 mm to about 0.035 mm.

The limited rechargeable lithium battery contains a current collector. The current collector collects the current flowing through the anode and the cathode, and it also functions as a bridge between the electrodes and electrical leads. The current collector may be a foil or mesh. The current collector is typically made of a conductive metallic material. The foil or mesh may be roughened or unroughened. Examples of conductive metallic material include copper, nickel, aluminum, carbon, silver, titanium and alloys thereof. The current collector may also be made of stainless steel. Alternatively, the current collector may be made of a conductive plastic or metallized plastic films. Metals used in such plastic films include aluminum, copper and carbon black. A specific example of a conductive plastic is metallized polyethylene film. In a preferred embodiment, the current collector of the cathode slurry is aluminum or stainless steel. The thickness of the current collector is about 0.01 mm to about 0.2 mm. In a preferred embodiment, the thickness of the current collector is about 0.02 mm to about 0.1 mm. In a more preferred embodiment, the thickness of the current collector is about 0.025 mm to about 0.05 mm. In another embodiment, the current collector may be a foil type or mesh type having two or more layers.

The limited rechargeable lithium battery may be encapsulated to provide protection against damage or environmental factors. In a preferred embodiment, the limited rechargeable lithium battery is encapsulated in a laminate. In this connection, the limited rechargeable lithium battery may be encapsulated in plastic film. Plastic films include polyamide, mylar, polyester, and polyolefin films. Upon encapsulation, provisions should be made so that electrical contact can be made from outside the cell to the conductive materials inside the battery.

The cathode slurry is prepared by mixing its respective components. The components are thoroughly mixed in order to form a uniform slurry. The thus formed uniform slurry may be separately stored in a tightly covered (air-tight) container before proceeding with fabrication of the limited rechargeable lithium battery. Alternatively, the uniformly mixed components may be immediately applied to a separator or a current collector and further processed.

In a preferred embodiment, a limited rechargeable lithium battery made in accordance with the present invention contains one anode and one slurry cathode. In another embodiment, a multilayer limited rechargeable primary lithium battery made in accordance with the present invention contains two or more anodes and two or more slurry cathodes, including a bipolar configuration.

The resultant limited rechargeable lithium battery may be partially or entirely encapsulated in various laminates to provide protection for the battery. For example, the lithium battery may be encapsulated in a film such as a polyamide film. If the battery is encapsulated, then provisions should be made so that electrical contact can be made from outside of the battery to the current collectors of the battery. This may be accomplished by an aperture in the laminate thereby exposing a selected area of each of the current collectors.

In one embodiment, the limited rechargeable lithium battery is made in a flat or laminar configuration. In another embodiment, the limited rechargeable lithium battery is made in a cylindrical configuration.

FIG. 1 is an illustration of a preferred embodiment of a flat limited rechargeable lithium battery according to the present invention. The limited rechargeable lithium battery 1 contains a slurry 5 surrounded by a separator 6 and a cathode current collector 3. Over the cathode plate 3 is an insulator 2. Underneath the separator 6 is a lithium foil 7, an anode current collector 9 and a base insulator 10. Window frames 4 are provided for structural support for the battery.

While not intending to be so limiting, the following examples illustrate the novel methods of the present invention.

Example 1

Figure 2A:
FIG. 2(A) is a graphical representation of voltage versus time for 8 cycles of the limited rechargeable lithium battery according to Example 1.

A cathode slurry is prepared as follows. 5.6 g of $LiMn_2O_4$ and 0.4 g of carbon black are mixed with 3.0 g $LiCF_3SO_3$, propylene carbonate and dimethoxyethane, and then applied to a stainless steel current collector. A battery is formed by combining with pressure a Li foil anode and a separator. A graphical representation of voltage versus time for eight cycles of the battery is shown in FIG. 2(A). The graph indicates that eight good cycles are obtainable from the battery. A graphical representation of discharge capacity versus cycle number of the battery is shown in FIG. 2(B). The graph indicates that an adequate discharge capacity is maintained for about nine cycles. And a graphical representation of coulombic efficiency versus cycle number of the limited rechargeable primary lithium battery is shown in FIG. 2(C). The graph indicates that coulombic efficiency is consistent through about ten cycles.

Example 2

A cathode slurry is prepared as follows. 5.6 g of $Li_2Mn_4O_9$ and 0.4 g of carbon black are mixed with 3.0 g $LiCF_3SO_3$, propylene carbonate and dimethoxyethane, and then applied to a nickel current collector. A battery is formed by combining with pressure a Li foil anode and a separator.

Example 3

A cathode slurry is prepared as follows. 5.6 g of $Li_2MnO_3$ and 0.4 g of carbon black are mixed with 3.0 g $LiCF_3SO_3$, propylene carbonate and dimethoxyethane, and then applied to a aluminum current collector. A battery is formed by combining with pressure a Li foil anode and a separator.

Example 4

A cathode slurry is prepared as follows. 5.6 g of $V_6O_{13}$ and 0.4 g of carbon black are mixed with 3.0 g $LiCF_3SO_3$, propylene carbonate and dimethoxyethane, and then applied to a copper current collector. A battery is formed by combining with pressure a Li foil anode and a separator.

While the invention has been explained in relation to its preferred embodiments, it is to be understood that various method thereof will become apparent to those skilled in the art upon reading this specification. Therefore, it is to be understood that the invention disclosed herein is intended to cover such modifications.

What is claimed is:

1. A limited rechargeable lithium battery comprising:

an anode;

a cathode slurry comprising
        about 55 to about 75% by weight of a transition metal oxide, wherein the transition metal oxide is at least one of a lithium transition metal oxide and a vanadium oxide, with the proviso that the transition metal oxide is not manganese dioxide,
        about 3 to about 8% by weight of a conductor, and
        about 20 to about 40% by weight of an organic electrolyte comprising an electrolyte salt and an organic solvent;

a separator between the anode and the cathode slurry; and at least two current collectors.

2. The battery of claim 1, wherein the anode is a metallic lithium anode.
3. The battery of claim 1, wherein the transition metal oxide is selected from the group consisting of $LiMn_2O_4$, $Li_2Mn_4O_9$, $Li_2MnO_3$ and $V_6O_{13}$.
4. The battery of claim 1, wherein the transition metal oxide is $LiMn_2O_4$.
5. The battery of claim 1, wherein the conductor is carbon black.
6. The battery of claim 1, wherein the electrolyte salt is $LiCF_3SO_3$.
7. The battery of claim 1, wherein the organic solvent is at least one of propylene carbonate and dimethoxyethane.
8. The battery of claim 1, wherein the separator is made of at least one polyethylene and polypropylene.
9. The battery of claim 1, wherein the current collector is a metal foil of at least one of aluminum, copper and nickel.
10. The battery of claim 1, wherein the current collector is a conductive plastic or a metallized plastic.
11. A limited rechargeable lithium battery comprising;

an anode:

cathode slurry comprising
        about 60 to about 70% by weight of a transition metal oxide, wherein the transition metal oxide is at least one of a lithium transition metal oxide and a vanadium oxide, with the proviso that the transition metal oxide is not manganese dioxide,
        about 4 to about 6% by weight of a conductor, and
        about 25 to about 35% by weight of an organic electrolyte comprising an electrolyte salt and an organic solvent;

a separator between the anode and the cathode slurry; and at least two current collectors.

12. The battery of claim 11, wherein the transition metal oxide is selected from the group consisting of $LiMn_2O_4$, $Li_2Mn_4O_9$, $Li_2MnO_3$, and $V_6O_{13}$.
13. The battery of claim 11, wherein the transition metal oxide is $LiMn_2O_4$.
14. The battery of claim 11, wherein the conductor is carbon black.
15. The battery of claim 11, wherein the electrolyte salt is $LiCF_3SO_3$.
16. The battery of claim 11, wherein the organic solvent is at least one of propylene carbonate and dimethoxyethane.

* * * * *